Figure 1:
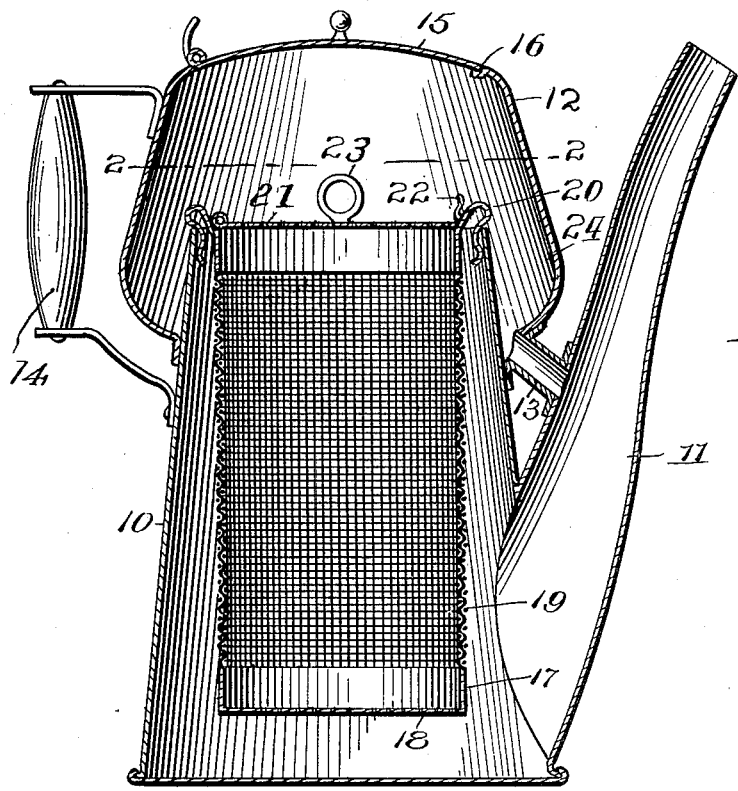

L. BARABÁS & J. HADA.
COFFEE PERCOLATOR.
APPLICATION FILED MAR. 30, 1914.

1,143,022.

Patented June 15, 1915.

Witnesses
J. M. Fowler Jr.
E. F. Takács

Inventors
Louis Barabás
Joseph Hada
By A. M. Wilson
Attorney

UNITED STATES PATENT OFFICE.

LOUIS BARABÁS AND JOSEPH HADA, OF CLEVELAND, OHIO.

COFFEE-PERCOLATOR.

1,143,022.  Specification of Letters Patent.  Patented June 15, 1915.

Application filed March 30, 1914. Serial No. 828,284.

*To all whom it may concern:*

Be it known that we, LOUIS BARABÁS and JOSEPH HADA, subjects of the King of Hungary, residing at Cleveland, in the county of Cuyahoga and State of Ohio, have invented certain new and useful Improvements in Coffee-Percolators, of which the following is a specification.

This invention relates to certain new and useful improvements in coffee percolators.

The primary object of this device is to provide a return to the boiler for the overflow of coffee caused from an overboiling of the same in the percolator.

Another object is to provide a surrounding chamber for a coffee boiler adapted to receive the overboiling coffee therefrom and to return the same to the boiler through the outlet spout.

A still further object is to provide a coffee boiler with a foraminous coffee-containing removable percolator and having the top thereof surrounded by a chamber adapted to receive the overboiling coffee and return the same by means of a by-pass and the outlet spout to the boiler while the percolator is removable through a top opening of the chamber.

With these general objects in view and others that will appear as the nature of the invention is better understood, the same consists in the novel combination and arrangement of parts hereinafter fully described, illustrated in the accompanying drawings, and pointed out in the appended claim.

In the drawings forming a part of this application and in which like designating characters refer to corresponding parts throughout the several views:—

Figure 2:
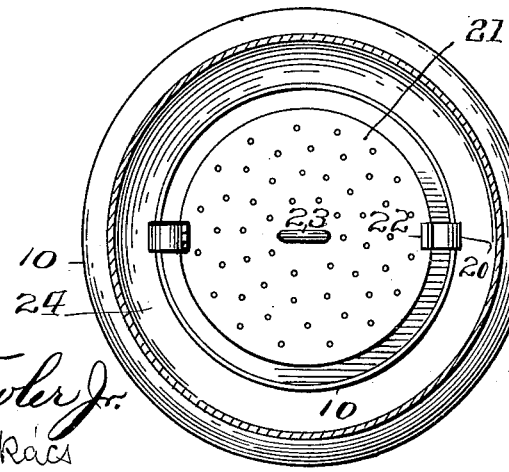

Figure 1 is a vertical central sectional view of the device, and, Fig. 2 is a horizontal transverse section taken upon line 2—2 of Fig. 1.

Referring more in detail to the drawings, the coffee boiler 10 is illustrated as provided with an outlet spout 11 substantially of the usual form while an overflow chamber 12 is mounted upon and surrounding the upper portion of the boiler and connected with said spout by means of the inclined by-pass 13.

The overflow chamber 12 is of dome shape and is provided with an annular recess at its lower end that surrounds the upper end of the boiler and receives the liquid in the boiler, and steam condensation when the liquid boils over, to return the same to the boiler by way of the by-pass 13.

A handle 14 is secured exteriorly between the casing and the boiler while a closure lid 15 is provided for the top opening 16 of the chamber.

A container or percolator 17 having a perforated bottom 18 and sides 19 is suspended in the top of the boiler 10 by means of opposite spring clips 20 while a perforated cover 21 is hinged upon the percolator and retained closed by means of the spring catch 22. The said catch 22 is of sufficient strength to allow the percolator to be removed from its seat upon the top of the boiler by means of the ring 23.

The complete operation of the device will be at once apparent from the above detailed description in that, the coffee being deposited in the percolator is suspended within the boiler while the necessary water may be supplied through the opening 16 of the chamber 12 by opening the lid 15 thereof. Upon an excessive boiling of the water and coffee, the same boils over the top edge of the boiler 10 and into the chamber 12 and from the lower annular chamber portion 24 thereof it passes through the by-pass 13 and returns to the boiler by way of the lower portion of the spout 11. By opening the lid 15, the percolator is removed, by grasping the ring 23 of the lid thereof and elevating the same out of the device through the chamber.

It will be noted by reference to Fig. 1, that the ends of the by-pass 13 are unobstructed, the object of this arrangement being in a certain and positive manner to prevent any clogging of the by-pass from coffee grounds that may escape from the percolator. This is a feature of importance, inasmuch as the location of the by-pass relative to the spout and to overflow chamber is such that should a strainer be combined with the by-pass, such as is commonly the practice, it would be an exceedingly difficult matter to free it from any grounds and at all times to keep it in operative and sanitary condition. It will further be seen that the point of juncture of the by-pass with the chamber 12 is at the extreme lower end of the latter, thus to insure return of all of any coffee that may escape from the percolator or body 10 into the chamber.

While the forms of the invention herein shown and described are what are believed to be preferable embodiments thereof, it is nevertheless to be understood that various forms and modifications may be had without departing from the spirit and scope of the invention as claimed.

What we claim as new is:—

The combination with a coffee pot and its spout, of an overflow chamber secured to the pot, and a by-pass communicating with the extreme lower end of the chamber and with the spout, the two ends of the by-pass being unobstructed whereby to insure return to the pot of any coffee escaping to the chamber, without danger of clogging.

In testimony whereof we affix our signatures in presence of two witnesses.

LOUIS BARABÁS.
JOSEPH HADA.

Witnesses:
H. V. WILLIAMS,
HARRY E. ORR.

Copies of this patent may be obtained for five cents each, by addressing the "Commissioner of Patents, Washington, D. C."